J. C. PFIEL.
Wheel-Plow.
No. 46,137.
Patented Jan. 31, 1865
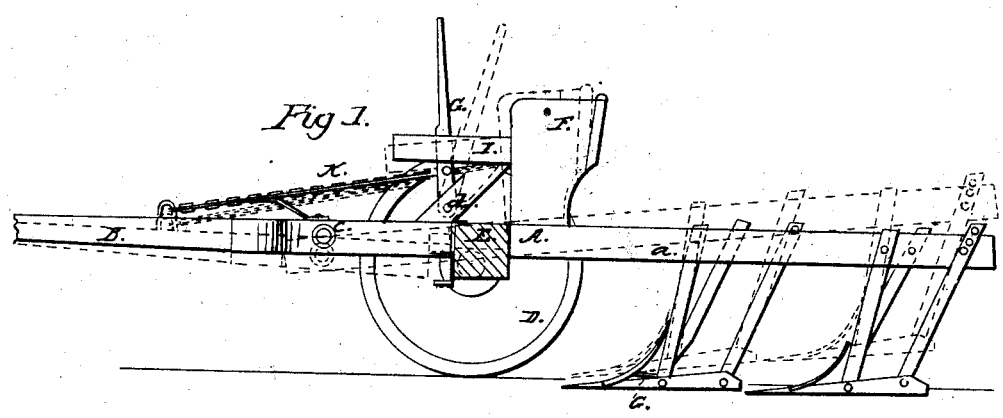
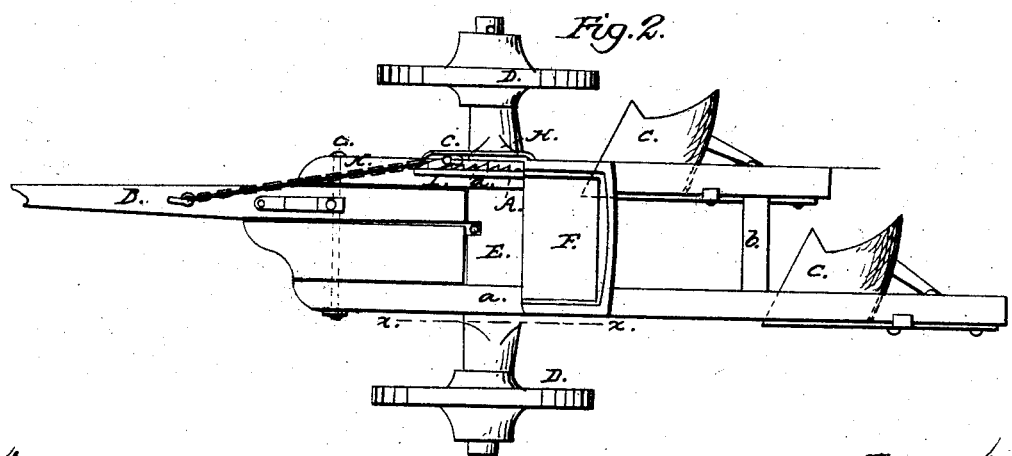

UNITED STATES PATENT OFFICE.

JOHN C. PFIEL, OF ARENZVILLE, ILLINOIS.

IMPROVEMENT IN GANG-PLOWS.

Specification forming part of Letters Patent No. 46,137, dated January 31, 1865.

*To all whom it may concern:*

Be it known that I, JOHN C. PFIEL, of Arenzville, in the county of Cass and State of Illinois, have invented a new and Improved Gang-Plow; and I do hereby declare that the following is a full, clear, and exact description thereof, which will enable others skilled in the art to make and use the same, reference being had to the accompanying drawings, making a part of this specification, in which—

Figure 1 is a side view of my invention, the axle being in section, as indicated by the line $x\,x$, Fig. 2. Fig. 2 is a plan or top view of the same.

Similar letters of reference indicate like parts.

This invention relates to a new and improved gang-plow; and it consists in constructing the same in such a manner that the plows may, when desired, be readily raised out of the ground by the driver on his seat, and the depth of the penetration of the plows into the earth regulated as may be desired.

A represents the frame of the machine, which is constructed of two parallel bars, $a\,a$, connected by one or more cross-bars, $b$. This frame has a draft-pole, B, attached to its front end by a bolt, $c$; and a plow, C, is attached to each bar $a$, one plow being in advance of the other, as shown in both figures. The plows C are provided with mold-boards of the usual or any proper form, and the frame A is mounted on two wheels, D D, the axle E of which is forward of the center of the frame A.

F is the driver's seat, placed on the frame A; and G is a lever, the lower end of which is attached to the right-hand side of the frame A by means of a fulcrum-pin, $d$. The lever G works through a guide, H, attached to the driver's seat F, and a bar, I, connected therewith, said bar I having a rack, J, secured to it for the lever G to catch into. The lever G is connected to the draft-pole B by means of a chain, K.

From the above description it will be seen that the driver by drawing backward the lever G at any time may raise the frame A, and consequently the plows C C, and the depth of the penetration of the latter in the earth may be regulated as desired by securing the lever G in the proper notch in the rack J, and when the lever G is drawn fully back the plows will be elevated entirely above the surface of the ground.

Thus by this simple arrangement the machine is placed fully under the control of the driver.

What I claim as new, and desire to secure by Letters Patent, is—

The arrangement of parts by which the relative positions of the plow-beam and the draft-pole are maintained after the front of the former has been depressed by the foot of the driver, and consisting of the tension-chain K and lever G with its retaining-rack J, the points of attachment being the draft-pole B and the frame A, the whole constructed and operated as described and represented.

JOHN C. PFIEL.

Witnesses:
FRANCIS S. CARNEY,
GEORG SCHMEHL.